US011698925B2

(12) United States Patent
Breaux

(10) Patent No.: US 11,698,925 B2
(45) Date of Patent: Jul. 11, 2023

(54) METHOD AND SYSTEMS FOR PROVIDING PERSONALIZED SUPPLEMENTAL AUDIO STREAMS

(71) Applicant: Rovi Guides, Inc., San Jose, CA (US)

(72) Inventor: Denisse Breaux, Lansdale, PA (US)

(73) Assignee: Rovi Guides, Inc., San Jose, CA (US)

(*) Notice: Subject to any disclaimer, the term of this patent is extended or adjusted under 35 U.S.C. 154(b) by 166 days.

(21) Appl. No.: 17/083,791

(22) Filed: Oct. 29, 2020

(65) Prior Publication Data

US 2021/0141828 A1 May 13, 2021

Related U.S. Application Data

(63) Continuation of application No. 16/137,296, filed on Sep. 20, 2018, now Pat. No. 10,853,413.

(51) Int. Cl.

| | |
|---|---|
| ***G06F 7/00*** | (2006.01) |
| ***G06F 16/635*** | (2019.01) |
| ***G06F 16/638*** | (2019.01) |
| ***G06F 16/683*** | (2019.01) |
| ***G06F 16/68*** | (2019.01) |

(52) U.S. Cl.

CPC .......... *G06F 16/635* (2019.01); *G06F 16/638* (2019.01); *G06F 16/683* (2019.01); *G06F 16/686* (2019.01)

(58) Field of Classification Search

CPC .... G06F 16/635; G06F 16/638; G06F 16/683; G06F 16/686

USPC .................................................. 707/600–899

See application file for complete search history.

(56) References Cited

U.S. PATENT DOCUMENTS

| | | | |
|---|---|---|---|
| 6,209,028 B1 | 3/2001 | Walker et al. | |
| 7,558,529 B2 | 7/2009 | Seshadri et al. | |
| 7,761,892 B2 | 7/2010 | Ellis et al. | |
| 8,046,801 B2 | 10/2011 | Ellis et al. | |
| 2005/0251827 A1 | 11/2005 | Ellis et al. | |
| 2009/0225994 A1 | 9/2009 | Topchy et al. | |
| 2013/0170813 A1* | 7/2013 | Woods .................. | H04N 5/765 386/E5.002 |
| 2014/0229866 A1 | 8/2014 | Gottlieb | |

FOREIGN PATENT DOCUMENTS

| | | |
|---|---|---|
| EP | 3 125 247 | 2/2017 |

OTHER PUBLICATIONS

International Search Report and Written Opinion in Application No. PCT/US2019/052000, dated Nov. 13, 2019.

* cited by examiner

*Primary Examiner* — Isaac M Woo

(74) *Attorney, Agent, or Firm* — Haley Guiliano LLP

(57) ABSTRACT

The application aids users by providing supplemental audio content. For example, the application determines a subject of content provided to user equipment during a first time period of the content. The application retrieves a profile associated with the user equipment and retrieves supplemental audio related to the profile and related to the subject of the content. The application detects a supplementation point in the content corresponding with audio content similar to a supplementation signature and transmits the supplemental audio to the user equipment for output at the supplementation point.

18 Claims, 8 Drawing Sheets

Figure 4:
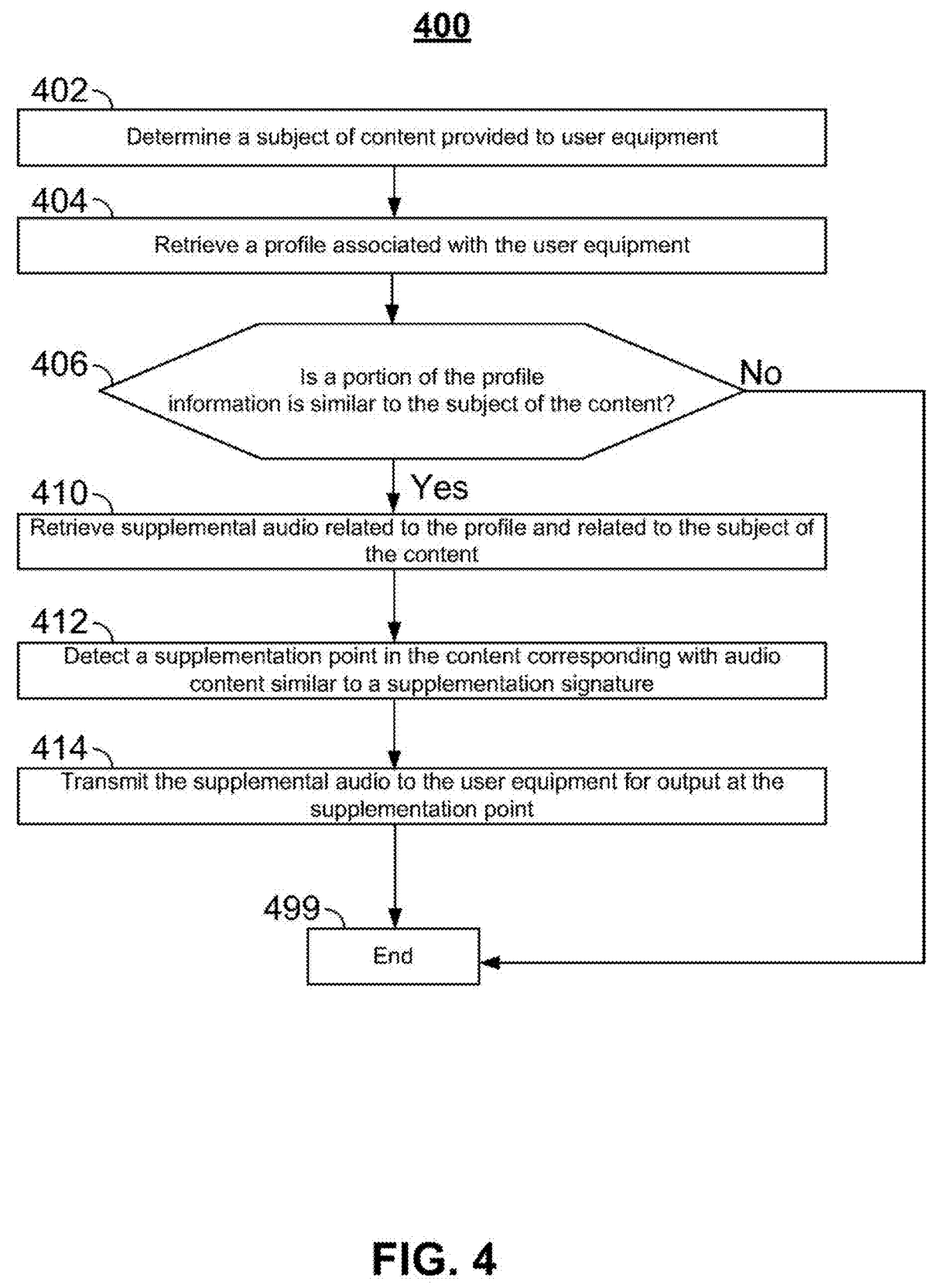

400

402 Determine a subject of content provided to user equipment

404 Retrieve a profile associated with the user equipment

406 Is a portion of the profile information is similar to the subject of the content?

No

Yes

410 Retrieve supplemental audio related to the profile and related to the subject of the content 412 Detect a supplementation point in the content corresponding with audio content similar to a supplementation signature 414 Transmit the supplemental audio to the user equipment for output at the supplementation point 499 End

METHOD AND SYSTEMS FOR PROVIDING PERSONALIZED SUPPLEMENTAL AUDIO STREAMS

CROSS-REFERENCE TO RELATED APPLICATION

This application is a Continuation of U.S. patent application Ser. No. 16/137,296, filed on Sep. 20, 2018. The disclosure of each application is hereby incorporated by reference herein in its entirety.

BACKGROUND

The present disclosure relates to content delivery and consumption systems, and, more particularly, content delivery and consumption systems that supplement audio content.

SUMMARY

An application is described herein for supplementing audio content during output. Modern users have considerably less tolerance for content that does not engage their interests. With so many options for content available, users tend to leave content that does not engage them or become distracted from the content they are watching with a litany of other content options. Present systems are unable to provide a user with interesting supplemental content, related to the content a user is consuming, without distracting the user from the current content. In conventional systems, if users are not interested in a portion of content, or the content contains a lull, many users will opt to change to new content. These systems do not automatically detect that a lull in content, or an uninteresting portion of content, is being played to the user. Thus, while these systems are able to output content, they do not solve the problem of how to maintain user engagement during content output, and more particularly during audio output. Furthermore, these systems are not able to personalize supplemental content during the lulls of content to different interests of multiple users. For example, users may become distracted or otherwise unwilling to continue consuming content if that content contains lulls or uninteresting content (e.g., low-volume sections or commercial breaks). If too many lulls in content occur, the user may choose to consume other content or stop playing content entirely.

The solution to problems described herein includes detecting that content generated for output to the user contains uninteresting content (e.g., based on metadata related to the content), or that the content contains lulls in audio or video (e.g., consecutive blank video frames, low audio levels for a sufficient period of time, or content containing less dialog than other portions of the content). To maintain the user's attention, it may be important to ensure the supplemental content is delivered in context with related content.

Systems and methods are described herein for an application that provides supplemental audio content during output of content. Specifically, the application determines (e.g., using control circuitry) a subject of content being output to user equipment at a first time period. For example, if a system is playing a hockey game on a display, the application may determine that hockey is the subject of the content. The application retrieves a profile associated with the user equipment. For example, the application may determine that a user is signed in to the user equipment and, using a user Id, retrieve a profile for that user. The application determines supplemental content (e.g., audio content) that is interesting to the user (e.g., related to information in the user's profile) and related to the subject of the content being output on the user equipment. For example, the application may determine that a biography of a player in the hockey game is of interest to the user, based on the user profile, and retrieve audio describing the player's rise in the hockey league. The application detects a supplementation point in content that has audio corresponding to a supplementation signature. For example, the application may compare audio in the content with a supplementation signature that indicates the supplemental content would not interfere with the content being output to the user equipment. The application transmits the supplemental content to user equipment for output to the user at the supplementation point. Thus, the application provides a user with relevant, and interesting, supplemental content specific to the user at points in time when the user may otherwise become disinterested in the content and does so without distracting the user from interesting content.

It should be noted that the methods and systems described herein for one embodiment may be combined with other embodiments as discussed herein.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 4 depicts an illustrative flowchart of a process for providing supplemental audio content to user equipment, in accordance with some embodiments of the disclosure;

DETAILED DESCRIPTION OF THE DRAWINGS

An application is described herein for content delivery and consumption systems, and, more particularly, content delivery and consumption systems that supplement audio content. The application provides supplemental content, to user equipment, that is related to content being output on user equipment.

Figure 1:
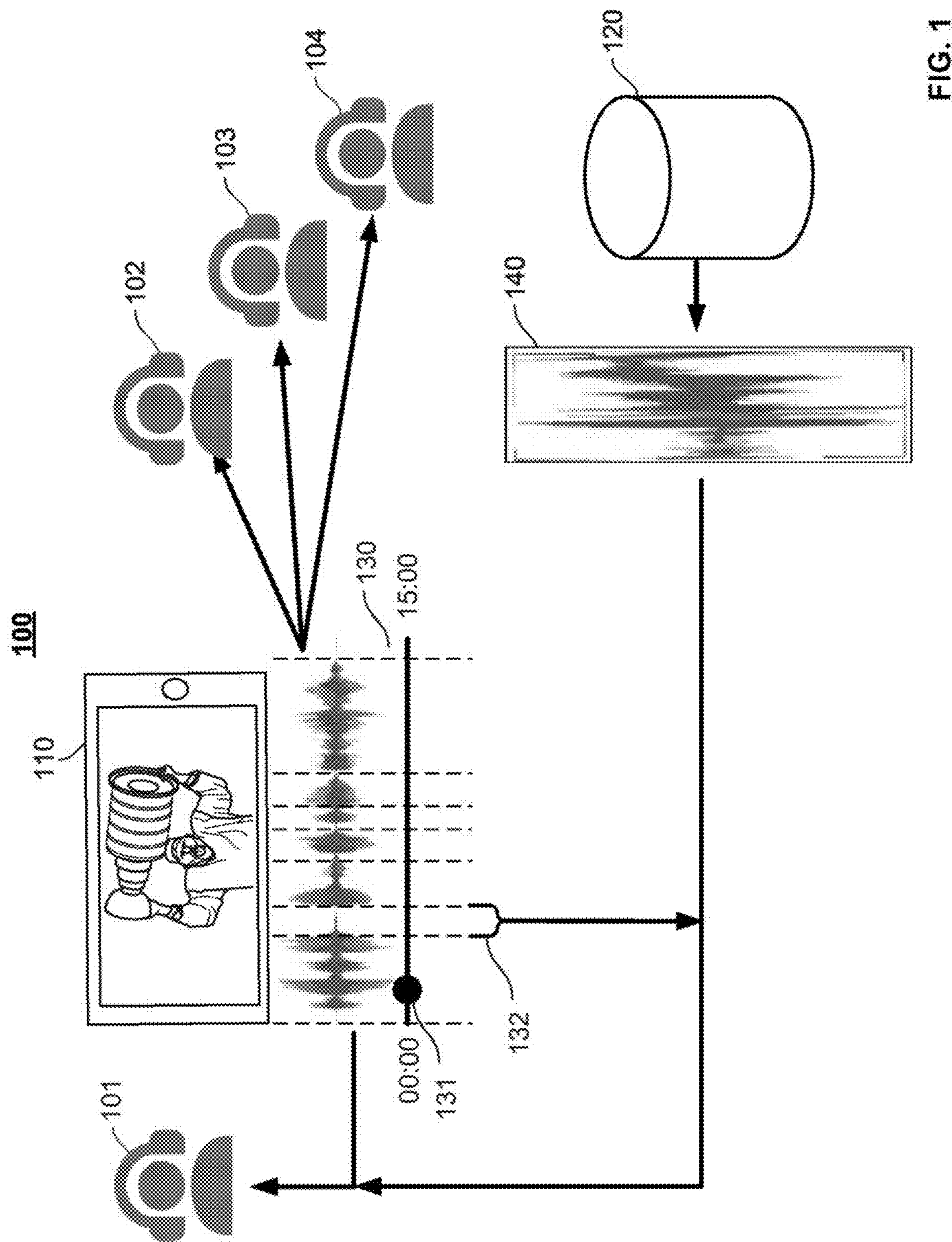
FIG. 1 shows an illustrative example of an application providing supplemental audio content to user equipment, in accordance with some embodiments of the disclosure.

FIG. 1 shows an illustrative example of an application providing supplemental audio content to a user equipment device, in accordance with some embodiments of the disclosure. FIG. 1 depicts a user equipment device 110 that is displaying content. In this example, the user equipment device 110 is displaying the end of a hockey game with a player raising a trophy. In FIG. 1, four users are watching content on the user equipment device 110: this includes a user 101 and three other users 102-104. As depicted in FIG. 1, the content may comprise audio content 130 as well as video content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

While the user equipment 110 outputs content to users, e.g., users 101-104, the application determines how to supplement audio content to the users without distracting the users from the main content. One exemplary process for supplementing content to users is described herein with reference to FIG. 1. Another exemplary process is described with reference to FIG. 4 below.

In some embodiments, the application determines (e.g., using control circuitry) a subject of the content at a first time period 131 of content. For example, the application may monitor output of content (e.g., a sports game) and analyze metadata associated with the content that indicates the subject (e.g., a hockey game). The application retrieves (e.g., via control circuitry) an identifier for a user equipment 110. For example, the user 101 may use a tablet device to watch a professional hockey game. The tablet may have an identifier, or the user may be logged in to the tablet with an account associated with an identifier. The application retrieves (e.g., via control circuitry) profile information based on the identifier. For example, the application may access a data source, such as datastore 120, that contains user profiles. Using the retrieved identifier, the application can retrieve a profile for a user of the media device containing information regarding the user's preferences and/or interests. For example, the application retrieves profile information for user 101.

The application retrieves (e.g., via control circuitry) supplemental audio 140 related to the profile and related to the subject of the content. For example, the application may retrieve an audio biography of one of the players in the hockey game. In some embodiments, the supplemental audio is retrieved from a data source such as datastore 120. As described with reference to FIG. 3, the datastore 120 may be a media content source 316. In some embodiments, the application may invoke a process such as described in FIG. 7 to facilitate selection of the supplemental audio.

The application detects (e.g., using control circuitry), within a relevance threshold time of the first time period 131, a supplementation point 132 in the content corresponding with audio content similar to a supplementation signature. For example, the application may monitor the audio of the content for, e.g., 30 seconds after detecting the first time period, to determine whether an appropriate point exists for supplementing the audio of the content. In some embodiments, the application may invoke processes 412A (FIG. 5) or 412B (FIG. 6) to determine a supplementation point. In some embodiments, the supplementation point is specifically selected to minimize interference between the supplemental audio content and the audio of the content being output by user equipment 110.

The application may use a relevance threshold (e.g., a time period) to prevent providing supplemental content out of context. If the application determines that a user is interested in a specific player on a hockey team that is shown in the content at the 2:37 mark, but the application detects that the next supplementation point is not until 10:32; then supplemental audio related to that athlete may be considered out of context. On the other hand, if the application detects a supplementation point at the 6:01 mark, then the supplemental audio may still be considered in context for output. Thus, the application may use the relevance threshold to ensure that supplemental audio is provided to the user within the appropriate contexts.

To facilitate output of the supplemental audio 140, the application transmits the supplemental audio 140 to the user equipment 110 for output at the supplementation point 132.

The examples described herein are with reference to providing specific supplemental content to a user 101. It would be recognized that similar techniques could be invoked to provide relevant, and potentially different, supplemental content to several of the users 101-104. Further, the supplemental content may be directed to a specific user, e.g., user 101, employing a uniquely addressable personal audio device (e.g., wireless headphones) or the same supplemental content may be directed to several of the users 101-104. In the scenario where the application transmits different supplemental content to different users 101-104, the application may use unique profiles for each recipient to determine relevant supplemental audio for each recipient.

The application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front-facing screen and a rear-facing screen, multiple front screens, or multiple angled screens. In some embodiments, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of the other types of user equipment devices, or for content available both through a television and one or more of the other types of user equipment devices. The applications may be provided as online applications (i.e., provided on a website), or as stand-alone applications or clients on user equipment devices. Various devices and platforms that may implement applications are described in more detail below.

Figure 2:
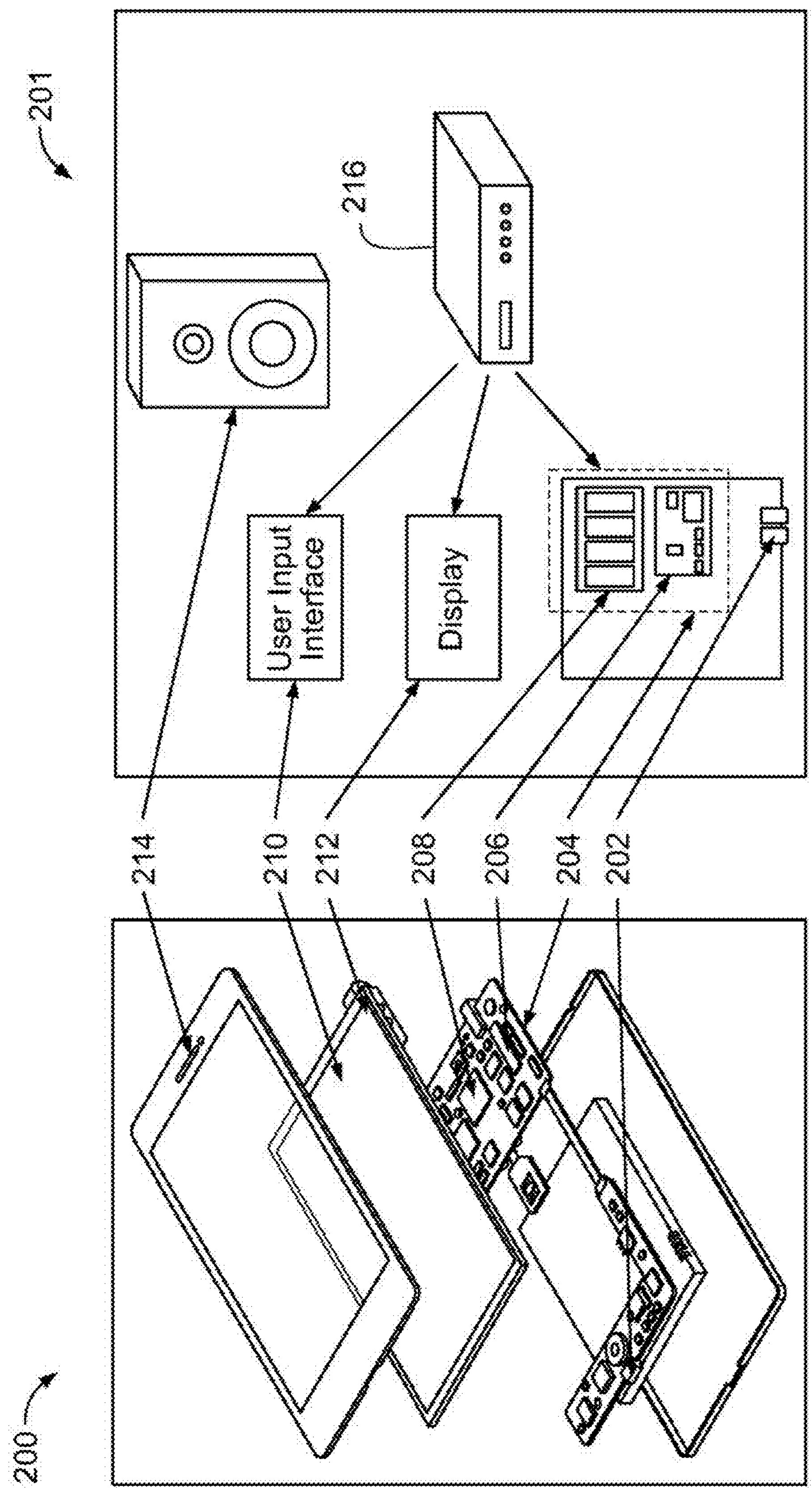
FIG. 2 is a block diagram of an illustrative user equipment in accordance with some embodiments of the disclosure.

Users may access content and the application from one or more of their media devices, i.e., user equipment. FIG. 2 shows generalized embodiments of an illustrative device, i.e., user equipment 110. For example, user equipment 110 may be a smartphone device, a tablet, or a remote control, such as illustrative user equipment 200. In another example, user equipment 110 may be a user equipment system 201. User equipment system 201 may include a set-top box 216. Set-top box 216 may be communicatively connected to speaker 214 and display 212. In some embodiments, display 212 may be a television display or a computer display. In some embodiments, set top box 216 may be communicatively connected to user interface input 210. In some embodiments, user interface input 210 may be a remote control device. Set-top box 216 may include one or more circuit boards. In some embodiments, the circuit boards may include processing circuitry, control circuitry, and storage (e.g., RAM, ROM, Hard Disk, Removable Disk, etc.). In some embodiments, circuit boards may include an input/output path. More specific implementations of user equipment devices are discussed below in connection with FIG. 3. Each one of user equipment device 200 and user equipment system 201 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and, specifically, processing circuitry 206) to one or more communications paths (described below). I/O functions may be provided by one or more of these communications paths but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiples of the same type of processing units (e.g., two Intel Core i7 processors) or multiple different processors (e.g., an Intel Core i5 processor and an Intel Core i7 processor). In some embodiments, control circuitry 204 executes instructions for an application stored in memory (e.g., storage 208). Specifically, control circuitry 204 may be instructed by the application to perform the functions discussed above and below. For example, the application may provide instructions to control circuitry 204 to generate the media guidance displays. In some implementations, any action performed by control circuitry 204 may be based on instructions received from the application.

In client server-based embodiments, control circuitry 204 may include communications circuitry suitable for communicating with an application server or other networks or servers. The instructions for carrying out the above-mentioned functionality may be stored on the application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 3). In addition, communications circuitry may include circuitry that enables peer-to-peer communication of user equipment devices, or communication of user equipment devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein as well as media guidance data described above. Nonvolatile memory may also be used (e.g., to launch a boot-up routine and other instructions). Cloud-based storage, described in relation to FIG. 3, may be used to supplement storage 208 or instead of storage 208.

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include scaler circuitry for upconverting and downconverting content into the preferred output format of the user equipment 200. Circuitry 204 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 208 is provided as a separate device from user equipment 200, the tuning and encoding circuitry (including multiple tuners) may be associated with storage 208.

A user may send instructions to control circuitry 204 using user input interface 210. User input interface 210 may be any suitable user interface, such as a remote control, mouse, trackball, keypad, keyboard, touch screen, touchpad, stylus input, joystick, voice recognition interface, or other user input interfaces. Display 212 may be provided as a stand-alone device or integrated with other elements of each one of user equipment device 200 and user equipment system 201. For example, display 212 may be a touchscreen or touch-sensitive display. In such circumstances, user input interface 210 may be integrated with or combined with display 212. Display 212 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 212 may be HDTV-capable. In some embodiments, display 212 may be a 3D display, and the interactive application and any suitable content may be displayed in 3D. A video card or graphics card may generate the output to the display 212. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 204. The video card may be integrated with the control circuitry 204. Speakers 214 may be provided as integrated with other elements of each one of user equipment device 200 and user equipment system 201 or may be stand-alone units. The audio component of videos and other content displayed on display 212 may be played through speakers 214. In some embodiments, the audio may be distributed to a receiver (not shown), which processes and outputs the audio via speakers 214.

The application may be implemented using any suitable architecture. For example, it may be a stand-alone application implemented on each one of user equipment device 200 and user equipment system 201. In such an approach, instructions of the application are stored locally (e.g., in storage 208), and data for use by the application is downloaded on a periodic basis (e.g., from an out-of-band feed, from an Internet resource, or using another suitable approach). Control circuitry 204 may retrieve instructions of the application from storage 208 and process the instructions to generate any of the displays discussed herein. Based on the processed instructions, control circuitry 204 may determine what action to perform when input is received from input interface 210. For example, movement of a cursor on a display up/down may be indicated by the processed instructions when input interface 210 indicates that an up/down button was selected.

In some embodiments, the application is a client server-based application. Data for use by a thick or thin client implemented on each one of user equipment device 200 and user equipment system 201 is retrieved on demand by issuing requests to a server remote to each one of user equipment device 200 and user equipment system 201. In one example of a client server-based application, control circuitry 204 runs a web browser that interprets web pages provided by a remote server. For example, the remote server may store the instructions for the application in a storage device. The remote server may process the stored instructions using circuitry (e.g., control circuitry 204) and generate the displays discussed above and below. The client device may receive the displays generated by the remote server and may display the content of the displays locally on equipment device 200. This way, the processing of the instructions is performed remotely by the server while the resulting displays are provided locally on equipment device 200. Equipment device 200 may receive inputs from the user via input interface 210 and transmit those inputs to the remote server for processing and generating the corresponding displays. For example, equipment device 200 may transmit a communication to the remote server indicating that an up/down button was selected via input interface 210. The remote server may process instructions in accordance with that input and generate a display of the application corresponding to the input (e.g., a display that moves a cursor up/down). The generated display is then transmitted to equipment device 200 for presentation to the user.

In some embodiments, the application is downloaded and interpreted or otherwise run by an interpreter or virtual machine (run by control circuitry 204). In some embodiments, the application may be encoded in the ETV Binary Interchange Format (EBIF), received by control circuitry 204 as part of a suitable feed, and interpreted by a user agent running on control circuitry 204. For example, the application may be an EBIF application. In some embodiments, the application may be defined by a series of JAVA-based files that are received and run by a local virtual machine or other suitable middleware executed by control circuitry 204. In some of such embodiments (e.g., those employing MPEG-2 or other digital media encoding schemes), the application may be, for example, encoded and transmitted in an MPEG-2 object carousel with the MPEG audio and video packets of a program.

Figure 3:
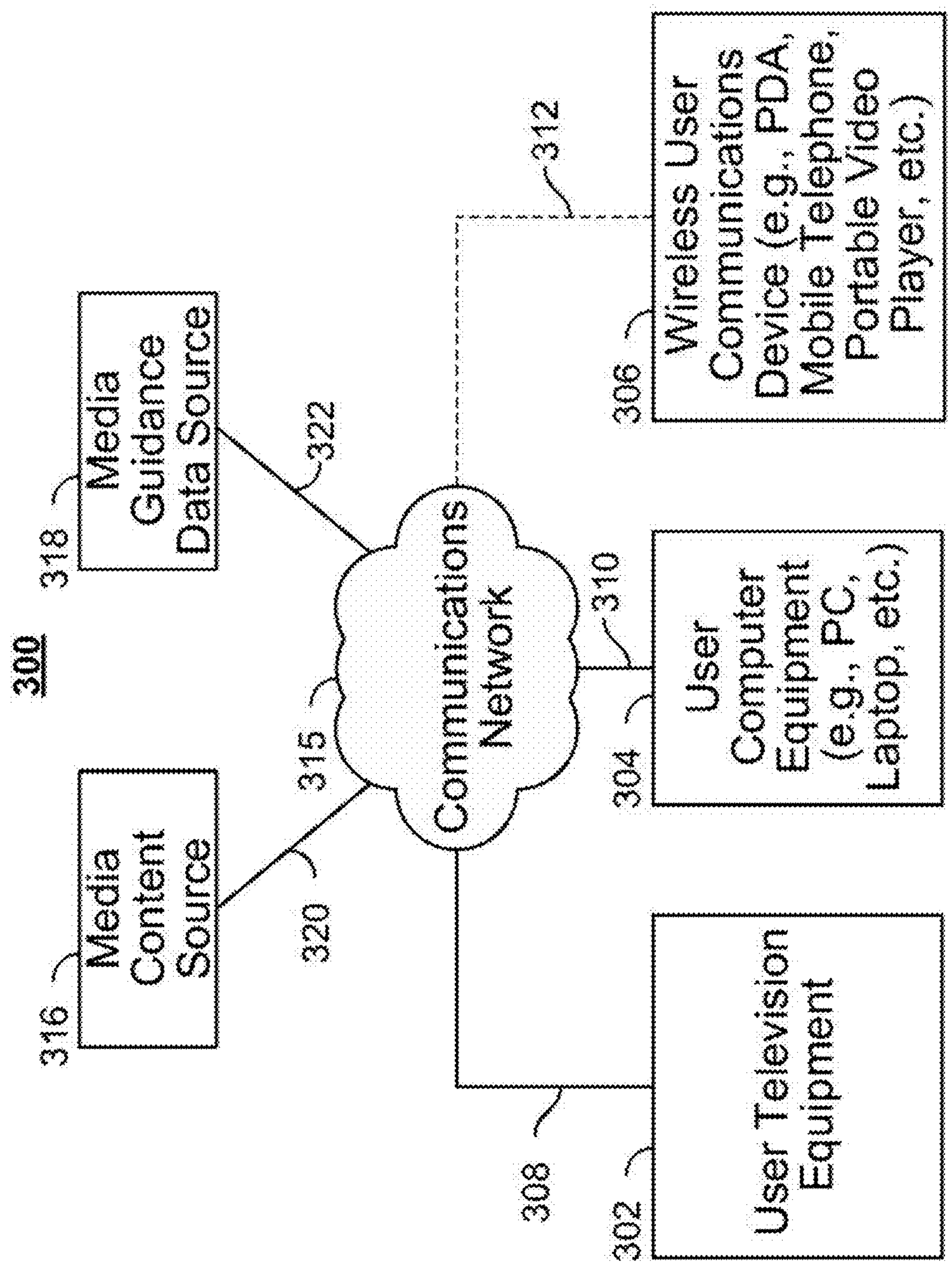
FIG. 3 is a block diagram of an illustrative media system in accordance with some embodiments of the disclosure.

Each one of user equipment device 200 and user equipment system 201 of FIG. 2 can be implemented in system 300 of FIG. 3 as user television equipment 302, user computer equipment 304, wireless user communications device 306, or any other type of user equipment suitable for accessing content, such as a non-portable gaming machine. For simplicity, these devices may be referred to herein collectively as "user equipment" or "user equipment devices" and may be substantially similar to user equipment devices described above. User equipment devices, on which an application may be implemented, may function as a stand-alone device or may be part of a network of devices.

Various network configurations of devices may be implemented and are discussed in more detail below.

A user equipment device utilizing at least some of the system features described above in connection with FIG. 2 may not be classified solely as user television equipment 302, user computer equipment 304, or a wireless user communications device 306. For example, user television equipment 302 may, like some user computer equipment 304, be Internet-enabled allowing for access to Internet content, while user computer equipment 304 may, like some television equipment 302, include a tuner allowing for access to television programming. The application may have the same layout on various different types of user equipment or may be tailored to the display capabilities of the user equipment. For example, on user computer equipment 304, the application may be provided as a website accessed by a web browser. In another example, the application may be scaled down for wireless user communications devices 306.

In system 300, there are typically more than one of each type of user equipment device, but only one of each is shown in FIG. 3 to avoid overcomplicating the drawing. In addition, each user may utilize more than one type of user equipment device and also more than one of each type of user equipment device.

In some embodiments, a user equipment device (e.g., user television equipment 302, user computer equipment 304, wireless user communications device 306) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent application settings across in-home devices and remote devices. Settings include those described herein, as well as channel and program favorites, programming preferences that the application utilizes to make programming recommendations, display preferences, and other desirable guidance settings. For example, if a user sets a channel as a favorite on, for example, the website www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the application.

The user equipment devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile voice or data network (e.g., a 4G or LTE network), cable network, public switched telephone network, or other types of communications network or combinations of communications networks. Paths 308, 310, and 312 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless paths, if desired). Communications with the user equipment devices may be provided by one or more of these communications paths but are shown as a single path in FIG. 3 to avoid overcomplicating the drawing.

Although communications paths are not drawn between user equipment devices, these devices may communicate directly with each other via communication paths, such as those described above in connection with paths 308, 310, and 312, as well as other short-range point-to-point communication paths, such as USB cables, IEEE 1294 cables, wireless paths (e.g., Bluetooth, infrared, IEEE 302-11x, etc.), or other short-range communication via wired or wireless paths. BLUETOOTH is a certification mark owned by Bluetooth SIG, INC. The user equipment devices may also communicate with each other directly through an indirect path via communications network 314.

System 300 includes content source 316 and media guidance data source 318 coupled to communications network 314 via communication paths 320 and 322, respectively. Paths 320 and 322 may include any of the communication paths described above in connection with paths 308, 310, and 312. Communications with the content source 316 and media guidance data source 318 may be exchanged over one or more communications paths but are shown as a single path in FIG. 3 to avoid overcomplicating the drawing. In addition, there may be more than one of each of content source 316 and media guidance data source 318, but only one of each is shown in FIG. 3 to avoid overcomplicating the drawing. (The different types of each of these sources are discussed below.) If desired, content source 316 and media guidance data source 318 may be integrated as one source device. Although communications between sources 316 and 318 with user equipment devices 302, 304, and 306 are shown as through communications network 314, in some embodiments, sources 316 and 318 may communicate directly with user equipment devices 302, 304, and 306 via communication paths (not shown) such as those described above in connection with paths 308, 310, and 312.

Content source 316 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 316 may be the originator of content (e.g., a television broadcaster, a Webcast provider, etc.) or may not be the originator of content (e.g., an on-demand content provider, an Internet provider of content of broadcast programs for downloading, etc.). Content source 316 may include cable sources, satellite providers, on-demand providers, Internet providers, over-the-top content providers, or other providers of content. Content source 316 may also include a remote media server used to store different types of content (including video content selected by a user), in a location remote from any of the user equipment devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 318 may provide media guidance data, such as the media guidance data described above. Media guidance data may be provided to the user equipment devices using any suitable approach. In some embodiments, the application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 318 may be provided to users' equipment using a client-server approach. For example, a user equipment device may pull media guidance data from a server, or a server may push media guidance data to a user equipment device. In some embodiments, an application client residing on the user's equipment may initiate sessions with source 318 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 318 may provide user equipment devices 302, 304, and 306 the application itself or software updates for the application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the application may generate promotions that entice the user to keep the particular service or source indicated by the score as one to which the user will likely terminate access.

Applications may be, for example, stand-alone applications implemented on user equipment devices. For example, the application may be implemented as software or a set of executable instructions which may be stored in storage 208 and executed by control circuitry 204 of each one of user equipment device 200 and user equipment system 201. In some embodiments, applications may be client-server applications where only a client application resides on the user equipment device, and a server application resides on a remote server. For example, applications may be implemented partially as a client application on control circuitry 204 of each one of user equipment device 200 and user equipment system 201 and partially on a remote server as a server application (e.g., media guidance data source 318) running on control circuitry of the remote server. When executed by control circuitry of the remote server (such as media guidance data source 318), the application may instruct the control circuitry to generate the application displays and transmit the generated displays to the user equipment devices. The server application may instruct the control circuitry of the media guidance data source 318 to transmit data for storage on the user equipment. The client application may instruct control circuitry of the receiving user equipment to generate the application displays.

Content and/or media guidance data delivered to user equipment devices 302, 304, and 306 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute applications (e.g., web-based applications or cloud-based applications), or the content can be displayed by applications stored on the user equipment device.

Media guidance system 300 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 3.

In one approach, user equipment devices may communicate with each other within a home network. User equipment devices can communicate with each other directly via short-range point-to-point communication schemes described above, via indirect paths through a hub or other similar device provided on a home network, or via communications network 314. Each of the multiple individuals in a single home may operate different user equipment devices on the home network. As a result, it may be desirable for various media guidance information or settings to be communicated between the different user equipment devices. For example, it may be desirable for users to maintain consistent application settings on different user equipment devices within a home network, as described in greater detail in Ellis et al., U.S. Patent Publication No. 2005/0251827, filed Jul. 11, 2005, which is hereby incorporated by reference herein in its entirety. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via an application implemented on a remote device. For example, users may access an online application on a website via a personal computer at their office, or a mobile device such as a PDA or web-enabled mobile telephone. The user may set various settings (e.g., recordings, reminders, or other settings) on the online application to control the user's in-home equipment. The online guide may control the user's equipment directly, or by communicating with an application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their application to communicate directly with content source 316 to access content. Specifically, within a home, users of user television equipment 302 and user computer equipment 304 may access the application to navigate among and locate desirable content. Users may also access the application outside of the home using wireless user communications devices 306 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 314. These cloud resources may include one or more content sources 316 and one or more media guidance data sources 318. In addition, or in the alternative, the remote computing sites may include other user equipment devices, such as user television equipment 302, user computer equipment 304, and wireless user communications device 306. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud directly, for example, from user computer equipment 304 or wireless user communications device 306 having a content capture feature. Alternatively, the user can first transfer the content to a user equipment device, such as user computer equipment 304. The user equipment device storing the content uploads the content to the cloud using a data transmission service on communications network 314. In some embodiments, the user equipment device itself is a cloud resource, and other user equipment devices can access the content directly from the user equipment device on which the user stored the content.

Cloud resources may be accessed by a user equipment device using, for example, a web browser, an application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 2.

FIG. 4 is an embodiment of a process 400 for providing supplemental audio content to user equipment. It should be noted that each step of process 400 can be performed by control circuitry 204 (e.g., in a manner instructed to control circuitry 204 by the application) or any of the system components shown in FIGS. 2-3. Control circuitry 204 may be part of user equipment (e.g., a device which may have any or all of the functionality of user television equipment 302, user computer equipment 304, and/or wireless communications device 306), or of a remote server separated from the user equipment by way of communication network 314, or distributed over a combination of both.

At step 402, the application determines (e.g., using control circuitry 204) a subject of the content at a first time period of content. For example, the application may monitor output of content (e.g., a sports game) with audio and analyze metadata associated with content that indicates the subject (e.g., a hockey game). In some embodiments, the application may utilize an I/O path 202 to retrieve metadata from a remote data source, such as media content source 316 or media guidance data source 318. In some embodiments, an additional service may exist and the application may communicate via communication network 315 to obtain metadata remotely. In some embodiments, the application may analyze (e.g., using control circuitry 204) the media content and identify key frames and/or key phrases from the content itself to determine the subject of the content. For example, the application may utilize automatic content recognition engines and techniques.

At step 404, the application retrieves (e.g., using control circuitry 204) a profile associated with user equipment (e.g., user equipment 110). For example, the application retrieves (e.g., using control circuitry 204) an identifier for a user equipment (e.g., user equipment 110). For example, a user may employ a tablet device to watch a professional hockey game. The tablet may have an identifier, or the user may be logged into the tablet with an account associated with an identifier. In some embodiments, a user equipment may store the identifier in storage such as storage 308. The application may access a data store that contains user profiles. Using the retrieved identifier, the application can retrieve a profile for a user of the media device containing information regarding the user's preferences and/or interests.

At step 406, the application determines (e.g., using control circuitry 204) whether a portion of the profile information is similar to the subject of the content. In some embodiments, the application may identify (e.g., using control circuitry 204) a plurality of audio periods in the content. The application may (e.g., using control circuitry 204) retrieve metadata for each of the plurality of audio periods in the content and compare the metadata for each of the plurality of audio periods in the content with the profile associated with the media device. For example, the application may perform natural language processing techniques to determine the similarity—or lack of similarity—between the content in the plurality of periods compared to the profile information. For example, the application may calculate the Levenshtein distance between the words in the profiles with metadata of the content to determine a level of similarity. In some embodiments, the application may compare a plurality of words from the profile with a plurality of words in the metadata. In still other embodiments, the application may calculate an eigenvector to determine similarity. The application may then identify, based on comparing the metadata for each of the plurality of audio periods in the content with the profile information, the first time period of audio, wherein audio in the first time period of the content is associated with metadata similar to the profile information. Thus, the application may determine whether the subject of the media content at the first time period is related, i.e., of interest, to the user's profile. If the application determines that the portion of the profile information is similar to the subject of the content then process 400 continues at step 410. If the application determines that the portion of the profile information is not similar to the subject of the content then process 400 concludes at step 499.

Figure 7:
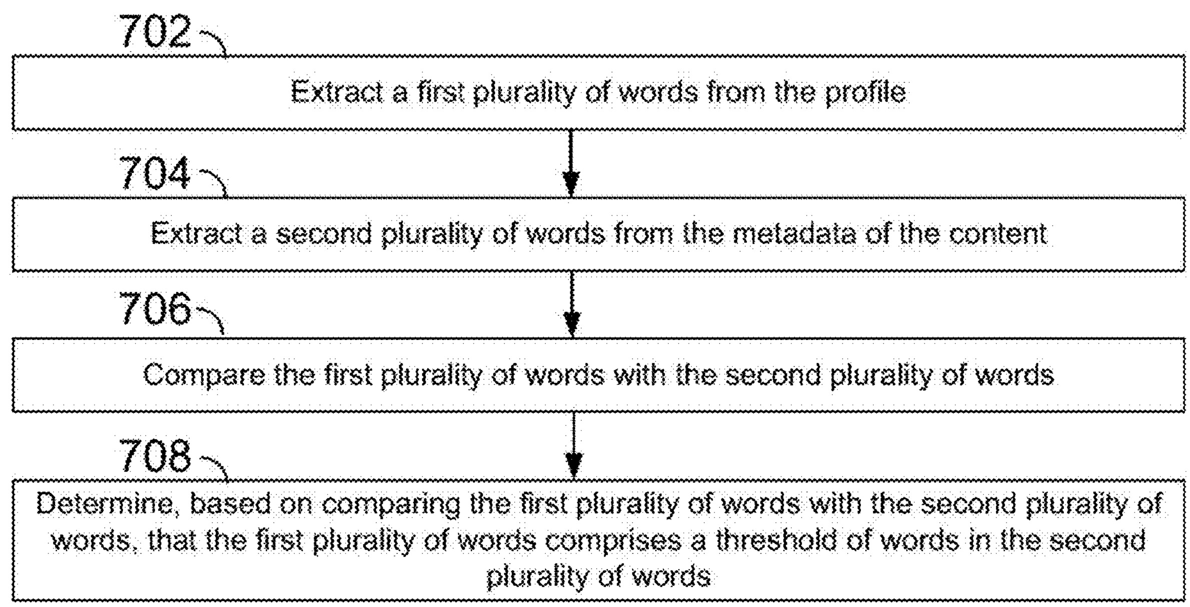
FIG. 7 depicts an illustrative flowchart of a process for retrieving supplemental audio related to the profile and related to the subject of the content, in accordance with some embodiments of the disclosure.

At step 410, the application retrieves (e.g., using control circuitry 204) supplemental audio related to the profile and related to the subject of the content. For example, the application may retrieve an audio biography of one of the players in the hockey game. In some embodiments, the application may communicate with a remote data source via communication network 315. For example, the application may use I/O path 202 to communicate with a media content source 316. In some embodiments, the application may retrieve supplemental content from storage 208. In some embodiments, the application may identify which content is the proper supplemental content as depicted in FIG. 7 and described below.

At step 412, the application detects (e.g., using control circuitry 204), within a relevance threshold time of the first time period, a supplementation point in the content corresponding with audio content similar to a supplementation signature. For example, the application may monitor the audio of the content 130 for, e.g., 30 seconds after retrieving the supplemental audio, to determine whether an appropriate point exists for supplementing the audio of the content. The application may use the relevance threshold to prevent providing supplemental content out of context. If the application determines that a user is interested in a specific player on a hockey team that is shown in the content at the 5:37 mark, but the application detects that the next supplementation point is not until 10:32, then supplemental audio related to that athlete may be considered out of context. On the other hand, if the application detects a supplementation point at the 6:01 mark, then the supplemental audio may still be considered in context for output. Thus, the application may use the relevance threshold to ensure that supplemental audio is provided to the user within the appropriate contexts. In some embodiments, the application may retrieve a predefined relevance threshold from storage 208. In some embodiments, the application may provide an interface to allow a user to define the relevance threshold. In some embodiments, the application may detect the supplemental period as depicted in FIGS. 5-6 and described below.

At step 414, the application transmits (e.g., via 10 path 202) the supplemental audio to the user equipment for output (e.g., via speaker 214) at the supplementation point. In some embodiments, the application transmits (e.g., across communication network 315) the supplemental audio to a media device for output at the supplementation point by first combining the supplemental audio with audio in the first time period of the content. For example, the application may alter the audio of the content and replace audio at the supplementation point with the supplemental audio. In some embodiments, the application transmits the supplemental audio separate from the content along with information directing the media device to generate output of the supplemental audio at the supplementation point. For example, the application may identify a start time of the supplementation point and generate an instruction to output the supplemental audio at the start time. The application would, in such embodiments, provide the generated instruction to the user equipment.

It should be noted that this embodiment can be combined with any other embodiment in this description and that process 400 is not limited to the devices or control components used to illustrate process 400 in this embodiment.

Figure 5:
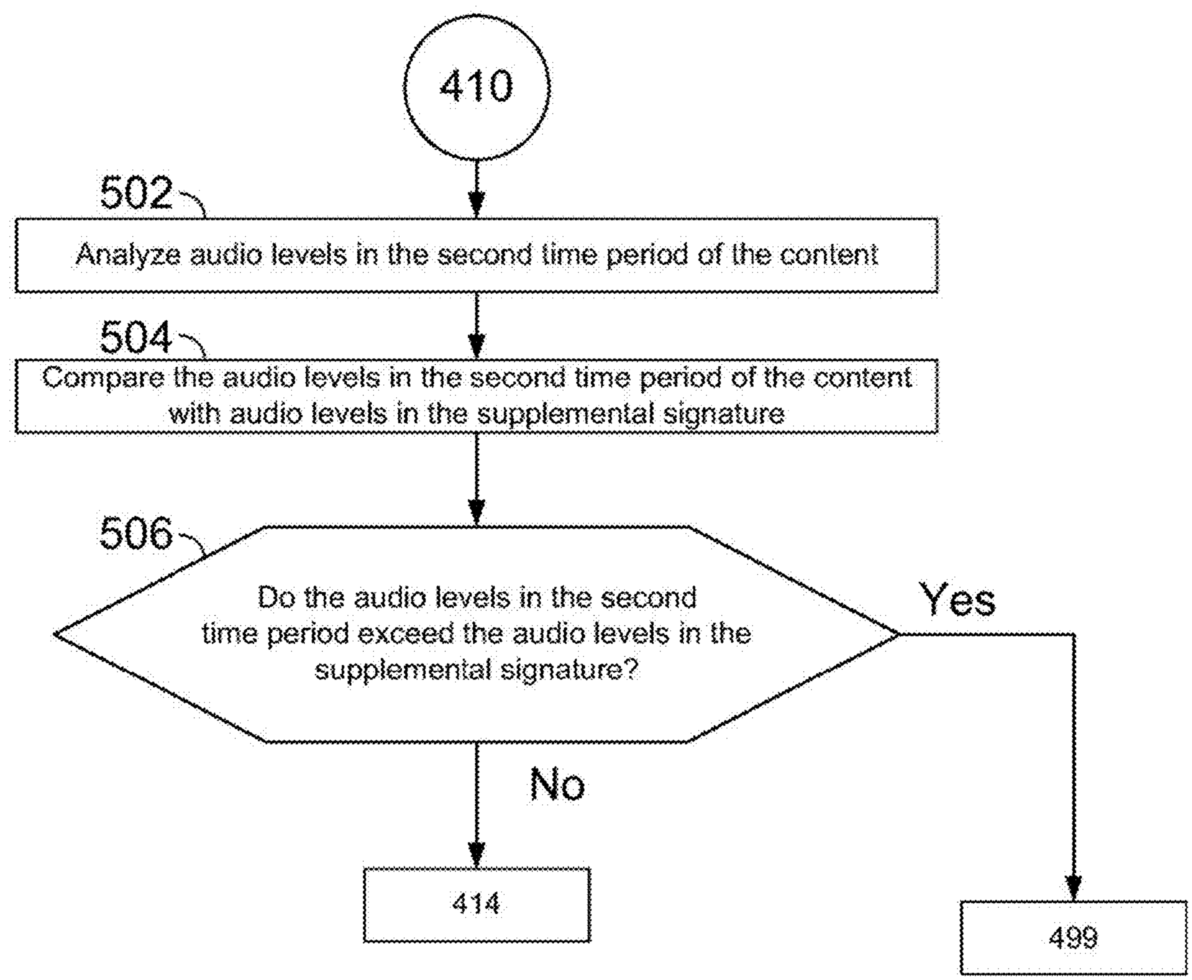
FIG. 5 depicts an illustrative flowchart of a process for detecting the supplementation point in the content corresponding with audio content similar to a supplementation signature, in accordance with some embodiments of the disclosure.
Figure 6:
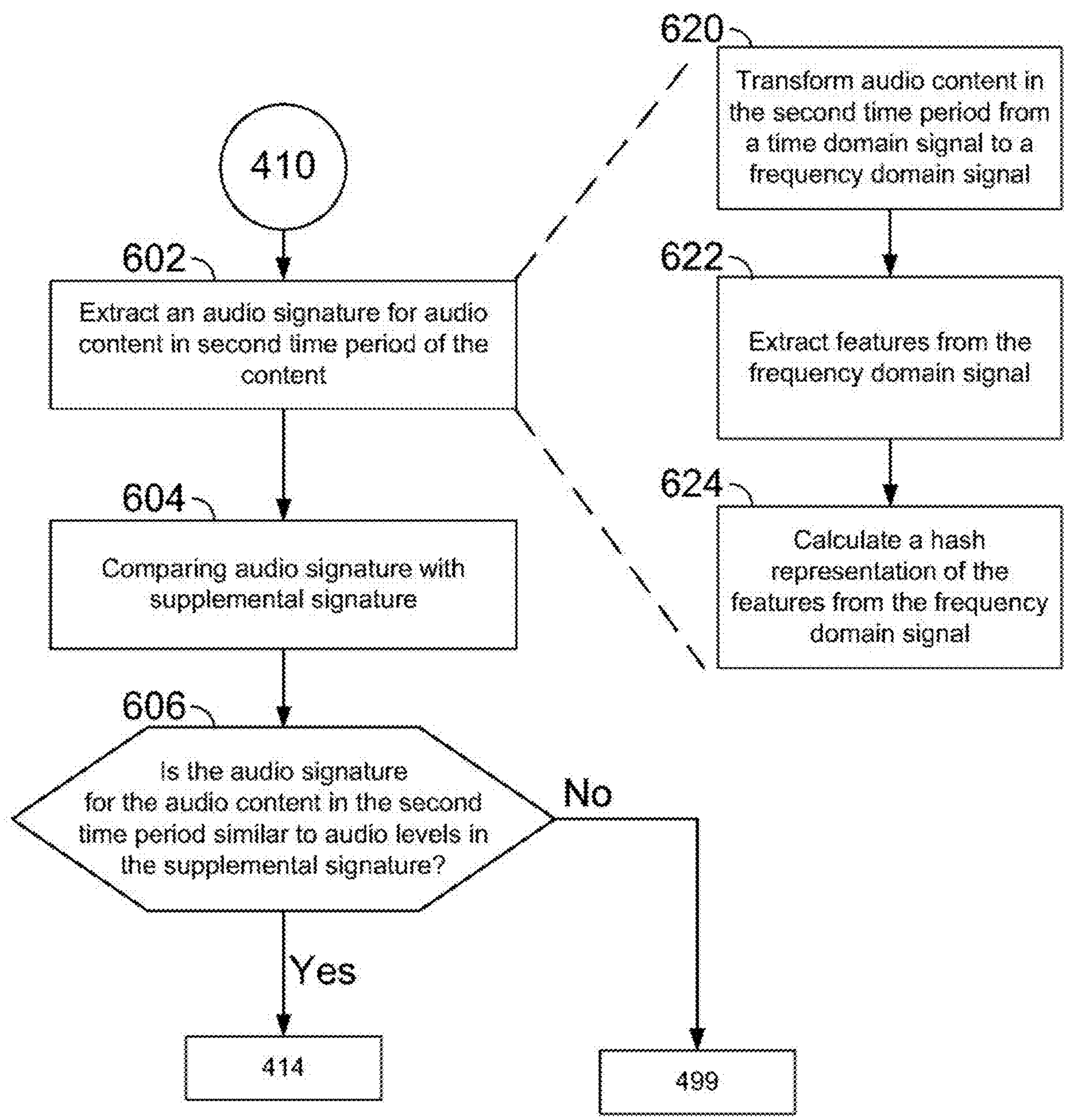
FIG. 6 depicts an illustrative flowchart of a second process for detecting the supplementation point in the content corresponding with audio content similar to a supplementation signature, in accordance with some embodiments of the disclosure.

FIG. 5 is an embodiment of a process 412A for detecting the supplementation point in the content corresponding with audio content similar to a supplementation signature. It should be noted that each step of process 412A can be performed by control circuitry 204 (e.g., in a manner instructed to control circuitry 204 by the application) or any of the system components shown in FIGS. 2-3. Control circuitry 204 may be part of user equipment (e.g., a device which may have any or all of the functionality of user television equipment 302, user computer equipment 304, and/or wireless communications device 306), or of a remote server separated from the user equipment by way of communication network 314, or distributed over a combination of both.

Process 412A continues from process 400 after step 410. At step 502, the application analyzes (e.g., using control circuitry 204) audio levels in a second time period of the content. For example, the application may detect an average amplitude of the audio levels across the audio periods after the first point and before the expiration of the relevance threshold. In some embodiments, the audio level may represent a raw data value captured by an input device (e.g., a microphone). In some embodiments, the audio level may capture a decibel measure of audio in the portions. Still other audio level measurement systems may be employed by the application.

At step 504, the application compares (e.g., using control circuitry 204) the audio levels in the second time period of the content with audio levels in the supplemental signature. For example, the application may compare the raw data value of the audio levels from the audio content of the first time period with audio levels represented in the audio signature.

At step 506, the application determines (e.g., using control circuitry 204), based on comparing the audio levels in the second time period with audio levels in the supplemental signature, whether the audio levels in the second time period, on average, exceed the audio levels in the supplemental signature. For example, supplementation application may sum the values of all data points in the audio signal and divide by the number of data points. In some embodiments, the application may utilize a sample of data points in the audio content to determine an average of the audio levels. In some embodiments, the application may compute a sound power calculation of the audio content in the content and compare that to a sound power calculation of the supplemental signature. In some embodiments, the application may utilize a specialized processor in the control circuitry (e.g., a digital signal processor) to make this determination. If the application determines that the audio levels in the second time period, on average, exceed the audio levels in the supplemental signature, then the process 412A concludes at step 499. If the application determines the audio levels in the second time period, on average, do not exceed the audio levels in the supplemental signature, then the process 412A continues at step 414 of process 400.

It should be noted that this embodiment can be combined with any other embodiment in this description and that process 412A is not limited to the devices or control components used to illustrate process 412A in this embodiment.

FIG. 6 is an embodiment of a second process for detecting the supplementation point in the content corresponding with audio content similar to a supplementation signature. It should be noted that each step of process 412A can be performed by control circuitry 204 (e.g., in a manner instructed to control circuitry 204 by the application) or any of the system components shown in FIGS. 2-3. Control circuitry 204 may be part of user equipment (e.g., a device which may have any or all of the functionality of user television equipment 302, user computer equipment 304, and/or wireless communications device 306), or of a remote server separated from the user equipment by way of communication network 314, or distributed over a combination of both.

Process 412B continues from process 400 after step 410. At step 602, the application extracts (e.g., using control circuitry 204) an audio signature for audio content in a second time period of the content. In some embodiments, the audio signature may comprise an audio fingerprint or hash calculation deterministically generated from the audio content in the second time period of the content.

In some embodiments, the application extracts the audio signature based on a hash representation of the audio at the second-time period. For example, process 412B may move to step 602 where the application (e.g., using control circuitry 204) transforms the audio content in the second time period from a time domain signal to a frequency domain signal. For example, the application may perform a Fourier transform on the audio signal. In another example, the application may perform a discrete cosine transform of the audio signal. In some embodiments, the control circuitry may comprise a digital signal processor designed to analyze audio signals.

At step 622, the application extracts (e.g., using control circuitry 204) features from the frequency domain signal. For example, the application may extract the power levels of specific frequencies from the frequency domain signal. The application may analyze the frequency domain signal across the entire audio signal for the second time period. In some embodiments, the application may analyze a portion of the audio content in the second time period, and in some embodiments, the application may analyze multiple samples in the first time period.

At step 624, the application calculates (e.g., using control circuitry 204) a hash representation of the features from the frequency domain signal. In some embodiments, the application may utilize a defined function such as MD5, SHA-1, RIPEMD-160, Whirlpool, SHA-2, SHA-3, BLAKE2.

At step 604, the application compares (e.g., using control circuitry 204) the audio signature for the audio content in the second time period of the content with the supplemental signature. In some embodiments, the supplemental signature represents an audio fingerprint or hash calculation deterministically generated for a predefined portion of the audio that is to be replaced with supplemental content. For example, a publisher may intentionally set aside portions of the audio for customization to include audio specifically intended to serve the preferences of users listening to the content.

At step 606, the application determines (e.g., using control circuitry 204), based on comparing the audio signature for the audio content in the second time period of the content with the supplemental signature, whether the audio signature for the audio content in the second time period of the content is similar to the supplemental signature. In some embodiments, the application may compare time-frequency graphs between the audio content in the second time period and the supplemental signature and determine whether the difference between one or more data points in the graphs is within a threshold distance. In some embodiments, the application may retrieve one more high energy data points, i.e., peaks in a time-frequency graph, to compare the signatures.

In some embodiments, the supplementation signature is defined to indicate that audio levels in audio frequencies corresponding with spoken language are below a threshold value. The application may (via, e.g., control circuitry 204) filter the audio content of the first time period outside of typical vocal frequencies correlated with dialog. For example, the application may filter the audio content of the audio in the first time period below 85 Hz and above 255 Hz (corresponding to a range associated with adult male and adult female voices). Thus, the application would compare a representation of human dialog in the second time period with a supplementation signature to determine whether or not dialog is present in the content. If the application determines that dialog is not present, or is at sufficiently low levels, the application may consider that portion of the content as ideal for supplementation. In some embodiments, the application may filter other ranges of audio typically associated with the vocal frequency, e.g., filter all audio below 200 Hz and above 2000 Hz. Still further embodiments may employ other techniques for identifying whether a particular time period in the content is appropriate for supplementation.

It should be noted that this embodiment can be combined with any other embodiment in this description and that process 412B is not limited to the devices or control components used to illustrate process 412B in this embodiment.

FIG. 7 is an embodiment of a process for retrieving supplemental audio related to the profile. It should be noted that each step of process 410A can be performed by control circuitry 204 (e.g., in a manner instructed to control circuitry 204 by the application) or any of the system components shown in FIGS. 2-3. Control circuitry 204 may be part of user equipment (e.g., a device which may have any or all of the functionality of user television equipment 302, user computer equipment 304, and/or wireless communications device 306), or of a remote server separated from the user equipment by way of communication network 314, or distributed over a combination of both.

At step 702, the application may (e.g., using control circuitry 204) extract a first plurality of words from the profile. For example, the application may access a data structure stored in the profile that contains a collection of terms the user has expressed interest in. These words may indicate, for example, that the user is interested in the offensive players on hockey teams.

At step 704, the application may (e.g., using control circuitry 204) extract a second plurality of words from metadata associated with the first time period of content. The second plurality of words may indicate that specific offensive players on a hockey team are present in the content in the first time period.

At step 706, the application may then compare (e.g., using control circuitry 204) the first plurality of words with the second plurality of words. For example, the application may calculate the Levenshtein distance between the words in each plurality to determine a level of similarity. In some embodiments, the application may compare the plurality of words for an identical match. In still other embodiments, the application may calculate an eigenvector between each plurality of words.

At step 708, the application determines (e.g., using control circuitry 204) whether the first plurality of words comprises a threshold of words in the second plurality of words. The application may compare several portions of the profile information with the subject of the content to determine how the profile information is related to the subject of the content and use that relationship as the basis for identifying the supplemental audio.

It should be noted that this embodiment can be combined with any other embodiment in this description and that process 410A is not limited to the devices or control components used to illustrate process 410A in this embodiment.

Figure 8:
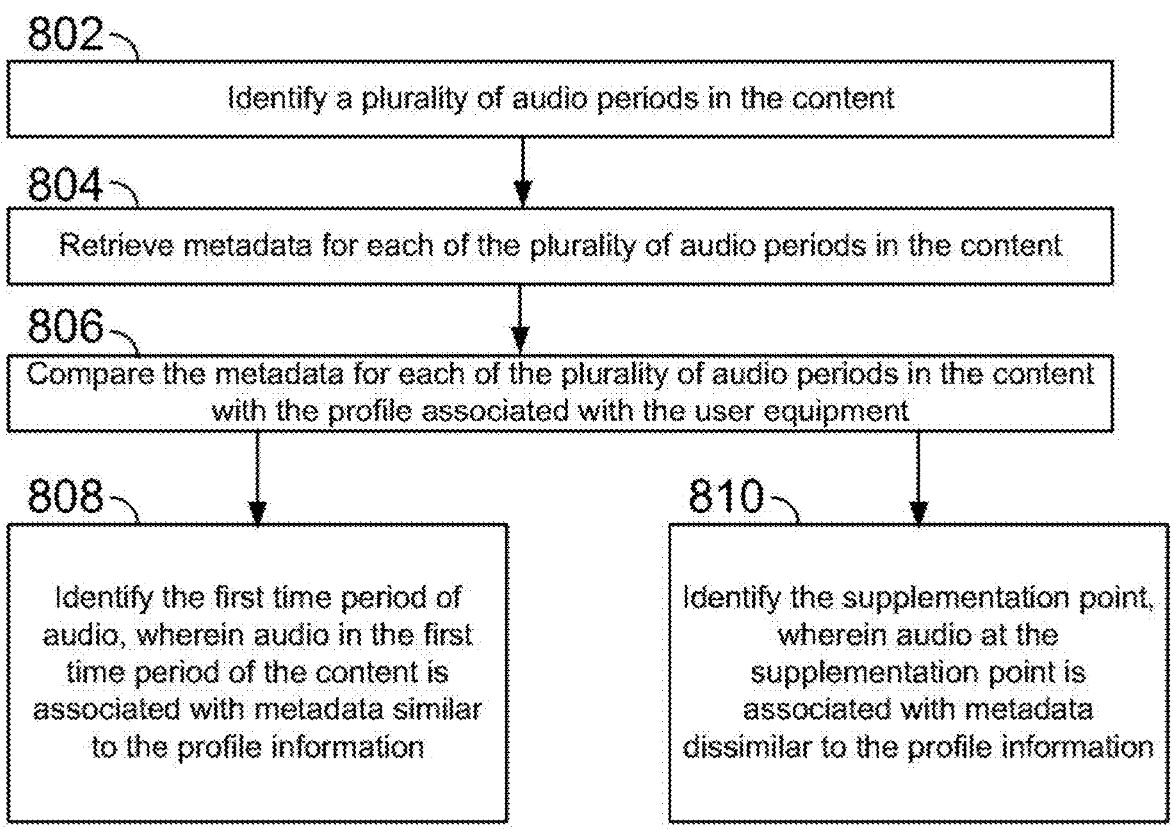
FIG. 8 depicts an illustrative flowchart of a process for identifying time periods in audio content related to the supplementation of audio, in accordance with some embodiments of the disclosure.

FIG. 8 is an embodiment of a process for identifying time periods in audio content related to the supplementation of audio. It should be noted that each step of process 800 can be performed by control circuitry 204 (e.g., in a manner instructed to control circuitry 204 by the application) or any of the system components shown in FIGS. 2-3. Control circuitry 204 may be part of user equipment (e.g., a device which may have any or all of the functionality of user television equipment 302, user computer equipment 304, and/or wireless communications device 306), or of a remote server separated from the user equipment by way of communication network 314, or distributed over a combination of both.

At step 802, the application identifies (e.g., using control circuitry 204) a plurality of audio periods in the content. For example, the application may employ various techniques to segment audio into several periods. In some embodiments, the application may determine scenes in audio based on the content of the audio and correlate those scenes to several periods of audio. In some embodiments, the application may analyze metadata of the content to determine periods of audio.

At step 804, the application may retrieve (e.g., using control circuitry 204) metadata for each of the plurality of audio periods in the content. For example, the application may contact a remote data source (e.g., media content source 316 or media guidance data source 318) to obtain information (e.g., metadata) about content.

At step 806, the application compares (e.g., using control circuitry 204) the metadata for each of the plurality of audio periods in the content with the profile associated with the media device. For example, the application may perform natural language processing techniques to determine the similarity—or lack of similarity—between the content in the plurality of periods compared to the profile information. The application may calculate the Levenshtein distance between the words in the profiles with metadata of the content to determine a level of similarity. In some embodiments, the application may compare a plurality of words from the profile with a plurality of words in the metadata. In still other embodiments, the application may calculate an eigenvector to determine similarity.

The application may continue at step 808 or 810, or both steps in parallel, by identifying the first time period or the supplementation point. At step 808, the application identifies (e.g., using control circuitry 204), based on comparing the metadata for each of the plurality of audio periods in the content with the profile information, the first time period, wherein audio at the first time period is associated with metadata similar to the profile information. At step 810, the application identifies (e.g., using control circuitry 204), based on comparing the metadata for each of the plurality of audio periods in the content with the profile information, the supplementation point, wherein audio at the supplementation point is associated with metadata dissimilar to the profile information.

It should be noted that this embodiment can be combined with any other embodiment in this description and that process 800 is not limited to the devices or control components used to illustrate process 800 in this embodiment.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method comprising:

determining a subject of a first time period in a content that is provided to user equipment;

retrieving a profile associated with the user equipment;

retrieving supplemental audio related to the profile and related to the subject of the content;

detecting a supplementation point in the content wherein the detecting the supplementation point comprises:

detecting presence of a human dialog in a second time period of the content after the first time period; and in response to determining that level of audio frequencies corresponding to the human dialog in the second time period is below a threshold:

retrieving metadata for the second time period;

comparing the metadata with the profile associated with the user equipment; and identifying, based on comparing the metadata for second time period with the profile, the supplementation point, wherein audio at the supplementation point is associated with metadata dissimilar to the profile information;

and transmitting the supplemental audio to the user equipment for output at the identified supplementation point.

2. The method of claim 1, wherein, in response to determining that human dialog is above the threshold, not transmitting the supplemental audio to the user equipment for output.

3. The method of claim 1, wherein, the level of audio frequencies corresponds to spoken language.

4. The method of claim 1, further comprising detecting if the human dialog corresponds to an adult voice.

5. The method of claim 1, further comprising filtering the level of frequencies to distinguish between a male and female voice.

6. The method of claim 1, further comprising:

extracting an audio signature for the human dialog in the second time period of the content;

comparing the audio signature for the human dialog in the second time period of the content with a supplemental signature of the supplemental audio; and determining, based on comparing, that the audio signature for the human dialog is similar to audio levels in the supplemental signature.

7. The method of claim 6, wherein extracting the audio signature for the human dialog in the second time period comprises:

transforming the supplemental audio in the first time period from a time domain signal to a frequency domain signal;

extracting features from the frequency domain signal; and calculating a hash representation of the features from the frequency domain signal.

8. The method of claim 1, further comprising:

identifying a start time of the supplementation point;

generating an instruction to play back the supplemental audio, the instruction comprising information identifying the supplemental audio and identifying the start time; and transmitting the instruction to the user equipment.

9. The method of claim 1, further comprising:

identifying a plurality of audio periods in the content;

retrieving metadata for each of the plurality of audio periods in the content;

comparing the metadata for each of the plurality of audio periods in the content with the profile associated with the user equipment; and identifying, based on comparing the metadata for each of the plurality of audio periods in the content with the profile information, the first time period of audio, wherein audio in the first time period of the content is associated with metadata similar to the profile information.

10. A system for providing supplemental audio content, the system comprising:

communication circuitry; and control circuitry configured to:

determine subject of a first time period in a content that is provided to user equipment;

retrieve a profile associated with the user equipment;

retrieve supplemental audio related to the profile and related to the subject of the content;

detect a supplementation point in the content wherein the detecting the supplementation point comprises:

detecting presence of a human dialog in a second time period of the content after the first time period; and in response to determining that level of audio frequencies corresponding to the human dialog in the second time period is below a threshold:

retrieving metadata for the second time period;

comparing the metadata with the profile associated with the user equipment; and identifying, based on comparing the metadata for second time period with the profile, the supplementation point, wherein audio at the supplementation point is associated with metadata dissimilar to the profile information;

and transmitting the supplemental audio to the user equipment for output at the identified supplementation point.

11. The system of claim 10, wherein, in response to determining that human dialog is above the threshold, not transmitting the supplemental audio to the user equipment for output.

12. The system of claim 10, wherein, the level of audio frequencies corresponds to spoken language.

13. The system of claim 10, further comprising detecting if the human dialog corresponds to an adult voice.

14. The system of claim 10, further comprising filtering the level of frequencies to distinguish between a male and female voice.

15. The system of claim 10, further comprising:

extracting an audio signature for the human dialog in the second time period of the content;

comparing the audio signature for the human dialog in the second time period of the content with a supplemental signature of the supplemental audio; and determining, based on comparing, that the audio signature for the human dialog is similar to audio levels in the supplemental signature.

16. The system of claim 15, wherein extracting the audio signature for the human dialog in the second time period comprises:

transforming the supplemental audio in the first time period from a time domain signal to a frequency domain signal;

extracting features from the frequency domain signal; and calculating a hash representation of the features from the frequency domain signal.

17. The system of claim 10, further comprising:

identifying a start time of the supplementation point;

generating an instruction to play back the supplemental audio, the instruction comprising information identifying the supplemental audio and identifying the start time; and transmitting the instruction to the user equipment.

18. The system of claim 10, further comprising:

identifying a plurality of audio periods in the content;

retrieving metadata for each of the plurality of audio periods in the content;

comparing the metadata for each of the plurality of audio periods in the content with the profile associated with the user equipment; and identifying, based on comparing the metadata for each of the plurality of audio periods in the content with the profile information, the first time period of audio, wherein audio in the first time period of the content is associated with metadata similar to the profile information.

* * * * *